July 3, 1962  J. P. AIKENS  3,042,548
POLYESTER RESINOUS COATING FOR SPECTACLE TEMPLE BARS
Filed April 29, 1959

INVENTOR.
JAMES P. AIKENS
BY
Eyre, Mann & Lucas
ATTORNEYS

United States Patent Office 3,042,548
Patented July 3, 1962

3,042,548
POLYESTER RESINOUS COATING FOR
SPECTACLE TEMPLE BARS
James P. Aikens, Rochester, N.Y., assignor to Bausch &
Lomb Incorporated, a corporation of New York
Filed Apr. 29, 1959, Ser. No. 809,660
6 Claims. (Cl. 117—113)

As is known the pressure of aluminum metal temple bars of spectacles against the skin is not comfortable and there is a tendency for soreness and irritation to develop at the areas of contact. The present invention relates to a resinous coating for aluminum metal temple bars which forms a resilient cushion that protects the skin and eliminates the irritation and soreness caused by the metal bars. More particularly the present invention relates to the method of preparing and applying a resinous coating to aluminum metal temple bars.

The problem of developing a resinous coating for metal temple bars which will perform satisfactorily and which may be applied in commercial mass production operations is not easily solved. First of all the coating must be non-toxic to the skin and it must be chemically resistant to materials with which it will come in contact such as perspiration and the usual organic solvents such as alcohol and those found in hair pomades and the like. The resinous coating must be sufficiently flexible to withstand bending manipulations during the final fitting without crazing or cracking and yet the coating must not be tacky. In order to satisfy commercial mass production operations it should be capable of application by a dip technique so that a plurality of bars may be processed simultaneously. The dip technique requires a composition which will give a smooth even coating of uniform thickness and for most efficient operation the coating should be applied in a single dip. The coating should be pleasant and attractive in appearance and capable of use in hot and cold climates.

In accordance with the present invention the above mentioned requirements are satisfied by means of a resinous coating composition which includes a permanently fusible and heat hardenable linear unsaturated polyester resin as an essential active ingredient thereof. The coating has exceptional physical and chemical resistance which insures durability for the life of the article to which it is applied. It is non-toxic to the skin and it is flexible so that it withstands repeated bending adjustments without crazing or cracking. The coating retains its desirable characteristics at both high and low temperatures and suitable pigments may be incorporated to provide a pleasing appearance. The composition is applied by dip technique and a smooth even coating of desired thickness is applied in a single dip. The resinous composition is cured in situ on the metal temple bar to provide a plastic envelope which does not strip off in use.

Briefly stated the resinous composition of the present invention includes a liquid linear unsaturated polyester resin and suitable cross-linking reagents preferably styrene which is mixed with a thixotropic rendering agent such as finely divided silica in such proportion to provide a thixotropic mixture which because of its thixotropic characteristics may be applied by dip technique to give a smooth even coating of desired thickness with sharp cut-off and no drips. Pigments are added and mixed into the composition to give the desired color. The resulting pigmented composition is then cooled down to a temperature which is low enough so that as a practical matter cross-linking is retarded to give the desirable pot life after catalysts are added to the permanently fusible and heat hardenable thermosetting resinous composition. The composition is now ready for use and it is maintained in its chilled state during the dipping operation. A plurality of metal temple bars clamped in a jig are dipped into the resinous composition to coat desirable portions of the bars. As in conventional dipping processes the speed of dipping controls the thickness of the coating. When the bars are removed from the composition best results are achieved by exposing the bars to the heat of an infrared lamp which very rapidly cures the resinous coating to the point that the liquid is set to form a firm gel with a relatively hard polymerized surface film. Gelling the liquid coating in this way is of great advantage in that it preserves the smooth even character of the coating which might otherwise sag or become distorted during final cure and the hard polymerized surface film excludes air from the interior of the coating which might otherwise adversely affect the cure. After partial curing by exposure to infrared heat the temple bars are placed in an oven and baked to complete polymerization and hardening of the thermosetting resin.

For the purpose of illustration reference will be made to the accompanying drawing in which.

Figure 1:
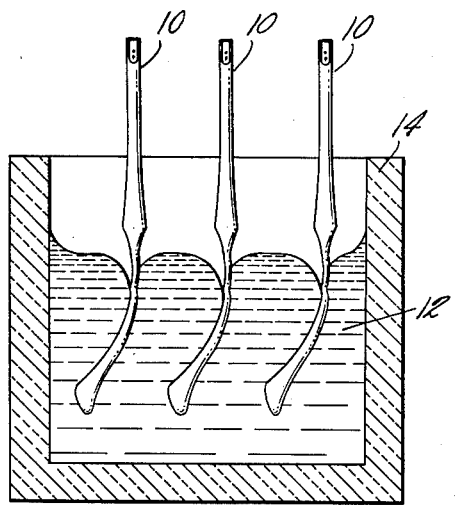
FIG. 1 illustrates a side view of uncoated temple bars as they are inserted into a thixotropic resinous composition made in accordance with the present invention.

As to materials, the polyester resin employed in the coating composition of the present invention is a linear unsaturated polyester resin dissolved in styrene or other cross-linking reagent. The degree of flexibility of these resins when cured into hard infusible solids is a function of the number of unsaturated bonds and a function of the structure of the resin chain between the unsaturated bonds. For a given resin structure flexibility increases with an increase in the number of unreacted olefinic bonds and it decreases as the number of reacted bonds increases. By reacting the unsaturated polyester with less than the theoretical amount of cross-linking reagent required to cross-link all of the olefinic bonds in the polyester chain, the degree of unsaturation in the final product may be controlled to give the desired flexibility.

The unsaturated polyester resin may be produced by many different reactions according to techniques known in the art. Unsaturation may be incorporated in the chain by esterifying a saturated aliphatic diol or polyol with unsaturated dicarboxylic acids and unsaturated anhydrides of carboxylic acid. Also it is possible to introduce unsaturation by reacting a saturated dicarboxylic acid with an unsaturated glycol containing olefinic bonds or a blend of saturated and unsaturated glycols. The methods for producing unsaturated polyesters are known in the art and as long as cross-linkable olefinic bonds are present in the polyester chain any of the known methods may be used.

The linear polyester chains are cross-linked at the olefinic bonds by copolymerization with an aromatic vinyl monomer. The monomer may be styrene or styrene derivatives such as vinyl toluene, dimethyl styrene, divinyl benzene and halogenated styrene. Use of the halogenated styrenes such as dichlorostyrene imparts the desirable property of flame retardance to the cured product. Also monomers such as diallyl phthalate and triallyl cyanurate may be used to cross-link the polyester.

The proportion of olefinic cross-linking monomer to the unsaturated polyester depends on the number of olefinic bonds that are present in the polyester chain. For example, when the proportion of olefinic bonds in the polyester is very small then only a small proportion of the monomer is required to partially react with the olefinic bonds. On the other hand a major proportion of olefinic cross-linking monomer may be employed when the proportion of reactive cross-linkable olefinic bonds in the unsaturated polyester is high. In general the concentration of the cross-linking monomer in the copolymerizable mixture may vary between about 10 to 90% by weight of the total mixture. For the purpose of the present invention I use about 20 to 45% of the cross-linking monomer in order to thermoset the polyester into a hard infusible solid flexible resin. Flexibility of the thermosetting resin is important. If the resin is too flexible it tends to be tacky and it will not stand up under normal manipulations during fitting. On the other hand if the resin is too hard and brittle it tends to craze or crack and chip off in use. In carrying out the invention satisfactory results have been achieved with a polyester-styrene resin which when cured has a flexural strength between about 1800 to 17,500 p.s.i. but best results are achieved by maintaining the flexibility between about 4800 to 11,500 p.s.i. Flexural strength is determined by conventional test customarily used in the art, as prescribed in United States Government regulations identified as LP-406B.

A great variety of unreacted polyester-styrene resins are commercially available in a broad range of flexibility from semi-rigid to rigid types. Some of the commercial resins are the so-called "flexibilizing" types which are designed to be added to the more rigid types prior to polymerization to increase flexibility of the cured products. Various reagents which have a known flexibilizing effect on synthetic resins may be employed such as dibutyl phthalate and dioctyl phthalate. These reagents are readily available on the open market and a polyester resin which will cure to the specified range of flexibility may be readily obtained or a rigid or semi-rigid form of resin may be blended with a commercially available flexibilizing material to form a mixture which when cured will provide a flexible coating within the range specified hereinabove.

In accordance with the present invention the polyester resin is modified to provide a thixotropic composition. The thixotropic resin may be applied in a single dip to provide a coating of desired thickness and the thixotropic resin insures sharp cut-off without drips when the temple bar is withdrawn. We prefer to use a finely divided form of amorphous silica as the thixotropic rendering agent. Silica, having a particle size between about 5 to 40 microns, is satisfactory and excellent results are achieved with a particle size between about 15 to 20 microns. If the particle size is substantially above 40 microns it tends to destroy the smooth appearance of the finished coating. Within the preferred range the coating has a surface texture that approximates the normal gloss and tone of the skin. The amount of thixotropic rendering agent employed is about 0.5 to 10% by weight of the resin and best results are achieved with about 3 to 4%. This range of thixotropic rendering agent results in a thixotropic resin composition with such viscosity that a resilient cushion may be applied to the temple bars in a single dip with sharp cut-off. If the amount of thixotropic rendering agent is below the specified range then the desired coating thickness will have to be built up by two or more dips. The lack of a sharp cut-off with the lower viscosity and the need for multiple dips makes the process less desirable than the single dip process that is preferred. If the amount of thixotropic rendering agent is above the specified range the mixture is so viscous that it becomes difficult to control.

Thixotropic rendering agents which may be employed include silica, mica, aluminum silicate, calcium carbonate, zirconium silicate and magnesium oxide. The thixotropic rendering agent such as silica is added to the polyester resin at room temperatures with conventional methods of agitation. Preferably a propeller type agitator is inserted into the polyester resins and mixing is continued until the silica is uniformly dispersed throughout the resin. For best results and in order to insure complete dispersion of the silica agglomerates the resin-silica mixture is passed through a colloid mill. If desired it may be passed through the mill a second or third time but this is optional. Any conventional colloid mill may be employed for uniformly dispersing the silica throughout the resin mixture. During the mixing process some olefinic cross-linking monomer may be volatized due to heat and if this occurs additional cross-linking monomer may be added to adjust the viscosity of the resin to the desired value. While the thixotropic resin composition is necessary as a practical matter for providing aluminum metal temple bars with a resilient cushion by dip technique, it may be desirable in certain applications to provide the aluminum metal with a very thin flexible surface coating by dip technique. In such case the thixotropic rendering agent may be omitted from the flexible polyester resinous composition.

Since the coating may be used with temple bars of various colors, pigments may be added to provide matching or contrasting colors in the coating. Any organic or inorganic pigments customarily used for dyeing thermosetting resins may be used and suitable blending of different pigments will result in any desired color. Examples of suitable pigments include, ferrite yellow light, cadmium sulfide primrose, chromium oxide green, sudan red, and chinoline yellow spirit soluble. The pigments are added with agitation similar to the method used for the silica but the resulting mix need not be passed through a colloid mill. The usual mixing precautions should be observed to insure uniform dispersion of the pigments throughout the resin mixture.

If air bubbles form in the resinous composition during mixing these may be removed by gentle agitation as by stirring the composition for about two hours or until the air bubbles are removed. Alternatively, the resin composition may be stored in a sealed container at room temperatures for about 16 hours or more. The storage process is aided by spreading a thin layer of cross-linking monomer over the surface prior to sealing and the excess monomer remaining after the storage time has ended may be decanted off.

Prior to addition of catalysts the resin composition is cooled to avoid premature polymerization and insure a useful pot life for the dipping operation. If the resinous composition is cooled to 35° F. the composition will have a pot life of about three hours and if cooled below 35° F. the pot life will increase.

The resulting resin composition is then catalyzed in conventional manner with the usual catalysts. For example, a polymerization accelerator may be added in amounts ranging from about 1 to 2% by combined weight of the resin, silica and pigments. The accelerator may be an organic peroxide or hydroperoxide such as benzoyl peroxide, acetyl peroxide, ditertiary butyl peroxide, lauroyl peroxide, cumene hydroperoxide, tertiary butyl hydroperoxide. After the accelerator is uniformly dispersed by propeller agitation about 2 to 3% of a polymerization promoter on a similar weight basis may be added to the resin mixture as is conventional in the art. Metals or metal salts such as cobalt resinate, cobalt maleate or cobalt naphthenate are examples of suitable polymerization promoters. The promoter is also thoroughly agitated to insure its uniform dispersion and thereafter the cooled, catalyzed resin composition is ready for use.

Figure 2:
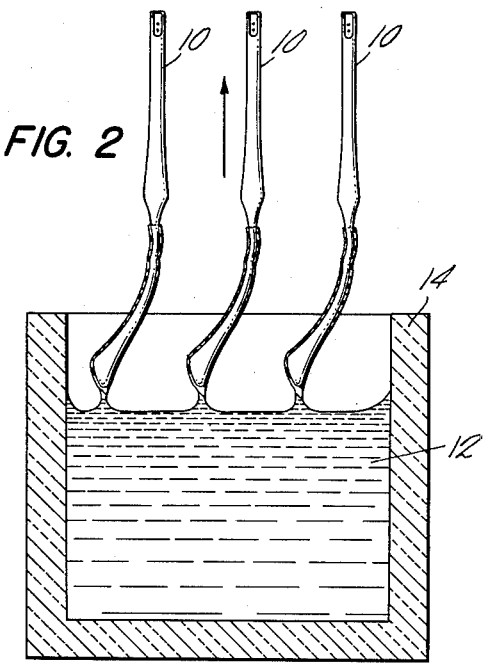
FIG. 2 illustrates the bars just before they are completely withdrawn from the composition.
Figure 3:
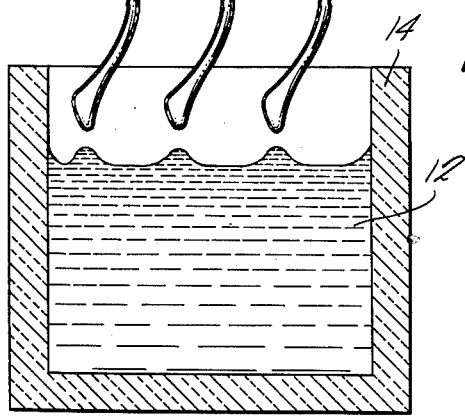
FIG. 3 illustrates the bars just after they are completely withdrawn from the composition.

The dipping operation may be carried out by conventional means. Referring to the drawings, a plurality of temple bars 10, held in a suitable jig (not shown) are inserted (FIG. 1) to the required depth by mechanical dipping apparatus (not shown) and then the bars are withdrawn from the resin composition (FIGS. 2 and 3). The composition 12 is identified in Example 1 (later described) and the resinous composition is held in a suitable vessel positioned in a conventional cooling bath 14 which maintains the temperature of the resinous composition at about 35° F. to insure a usable pot life of the material of at least three hours.

The speed at which the bars are withdrawn from the composition will determine the thickness of the coating as best shown in FIGS. 2 and 3. Because of the thixotropic nature of the resinous composition the coating is applied in a smooth layer of desired thickness and there is a sharp cut-off without drips as best shown in FIG. 3.

Figure 4:
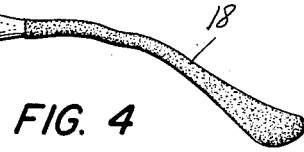
FIG. 4 illustrates a finished coated temple bar.

The resin coating is cured in situ on the temple bar by application of heat. Best results are obtained if immediately after withdrawal from the resinous composition the temple bars are placed under an infrared lamp which causes the surface of the resin coating to gel. About 5 minutes of exposure to the infrared lamp is sufficient to achieve a partial polymerization of the outer surfaces of the coating and thereafter the bars are baked in an oven for approximately three hours at temperatures ranging from about 200 to 250° F. The baking treatment completes the polymerization of the thermosetting resin coating and the temple bars may be either packaged or if desired aged overnight prior to packaging. A finished temple bar 10 with the resinous coating 18 in place thereon is shown in FIG. 4.

The following example will illustrate the process of the invention when used with commercial polyester-styrene resins.

Example 1

A laboratory stirrer was fitted with a propeller type agitator blade and the stirrer was inserted into a beaker containing 3500 grams of Hetron No. 31 polyester-styrene resin. To this was added 1500 grams of Hetron No. 42 polyester-styrene resin with agitation and the mixture was stirred at room temperatures until the two resins were mutually blended and dissolved. Hetron is the trade name for a series of polyester-styrene resins manufactured by the Hooker Chemical Company (see pages 102 and 107 of Supplements I and II respectively to Handbook of Materials Trade Names by Zimmerman & Lavine, 1953) in accordance with U.S. Patent Nos. 2,783,215, 2,779,700 and 2,779,701. Hetron No. 31 is a semi-rigid type resin and Hetron No. 42 is a so-called "flexibilizing" resin designed to increase the flexibility of more rigid type resins.

Agitation of the blended base resin was continued and 190 grams of amorphous silica with particle sizes ranging from 15 to 20 microns were slowly added to the base resin. Stirring was continued until the thixotropic resin composition had a smooth consistency. Thereafter the composition was passed through a colloid mill to insure thorough dispersion of the silica throughout the resin. 208 grams of styrene monomer were added to the homogenized composition to adjust its viscosity to 22,000 Brookfield centipoises at room temperature. To 4500 grams of the resulting composition were added 135 grams of an aqueous titanium dioxide paste, 23 grams of a suspension of jeweler's rouge, and 17 grams of a black pigment sold as "Plastic Black" 4000–DPB–1 by the Claremont Pigment Dispersion Corporation. The pigmented mix was thoroughly stirred until a uniform standard flesh color was obtained. The mix was then poured into a glass jar, 25 grams of styrene monomer were spread over the surface of the mix and the jar was capped and stored for 16 hours at room temperature.

850 grams of the stored mix was poured into a one liter beaker and the mix was cooled in a refrigerator to 35° F. The cooled beaker was immersed in a water bath to maintain a resin temperature of 35° F. during the rest of the process. A propeller type agitator was inserted into the cooled resin mix and as stirring began 21 grams of cobalt naphthenate were added. After all traces of the cobalt naphthenate disappeared 12.0 grams of cumene hydroperoxide were added and stirring was continued until all of it was dissolved. The catalyzed resin composition was now ready for use and its temperature was controlled at 35° F. during the dipping operation.

A dozen anodized aluminum temple bars were clamped in a jig and mechanically lowered into the resin mix to a depth of 2½ inches. The temple bars were withdrawn at a rate of 0.875 inch per minute, which deposited a thin coating of about eight to fifteen thousandths of an inch thick on the bars. Immediately after withdrawal the coated bars were placed under an infrared lamp for six minutes. The bars were then placed in an oven and baked for three hours at 235° F. The coated bars were removed from the oven, allowed to cool and age overnight prior to packaging.

The term aluminum metal as used in the specification and claims is intended to include aluminum, aluminum alloys and anodized aluminum.

It will be understood that it is intended to cover all changes and modifications of the preferred embodiment of the invention herein chosen for the purpose of illustration which do not constitute departures from the spirit and scope of the invention.

What is claimed is:

1. The method of forming a hard but flexible resinous coating on spectacle temple bars of aluminum metal which comprises the steps of mixing a finely divided thixotropic rendering agent with a polymerizable linear unsaturated polyester resin and a minor amount of copolymerizable aromatic vinyl cross linking monomer in the proportion of about 0.5 to 10% by weight of the polyester resin and monomer, agitating the resulting mixture to disperse the thixotropic rendering agent therein in substantially uniform manner to form a thixotropic mixture which exhibits liquid coating characteristics when a metal temple bar is dipped therein, cooling the thixotropic mixture to a temperature of at least 35° F., and then dipping at least one aluminum metal temple bar into the prepared composition, withdrawing the temple bar from the said composition and then curing the resin to form a hard but flexible coating of flexural strength between about 1800 and 17,500 p.s.i. which is capable of withstanding bending manipulation without crazing or cracking.

2. The method specified in claim 1 which includes the step of passing the resinous mixture through a colloid mill at least once before the mixture is cooled.

3. The method specified in claim 1 which includes the step of withdrawing the temple bar from the resinous composition at a controlled rate of speed of about 0.875 inch per minute in order to form a coating of about .008 to .015 of an inch thick in a single dip.

4. The method specified in claim 1 which includes the step of exposing the resinous coating on the aluminum metal temple bar to infra red heat after removal from the resinous mixture to partially cure the resin composition on the temple bar and then subsequently completing the cure by further application of heat.

5. The method specified in claim 1 which includes the step of adding pigments to the composition before it is cured.

6. The method of forming a hard but flexible resinous coating on spectacle temple bars of aluminum metal which comprises the steps of mixing a finely divided silica of particular size between about 5.0 to 40 microns with a polymerizable linear unsaturated polyester resin and a minor amount of a copolymerizable aromatic vinyl cross linking monomer in the proportion of about 0.5 to 10% silica by weight of the polyester resin and monomer, agitating the resulting mixture to disperse the silica therein in substantially uniform manner to form a thixotropic mixture which exhibits liquid coating characteristics when a metal temple bar is dipped therein, cooling the thixotropic mixture to a temperature of at least 35° F., and then dipping at least one aluminum metal temple bar into the prepared composition, withdrawing the temple bar from the said composition and then curing the resin on the temple bar to form a hard but flexible coating of flexural strength between about 1800 to 17,500 p.s.i. which is capable of withstanding bending manipulations without crazing or cracking.

References Cited in the file of this patent

UNITED STATES PATENTS

| | | |
|---|---|---|
| 2,257,280 | Scholz et al. | Sept. 30, 1941 |
| 2,457,657 | Glick | Dec. 28, 1948 |
| 2,514,389 | Glick | July 11, 1950 |
| 2,631,137 | Loritsch et al. | Mar. 10, 1953 |
| 2,857,359 | Schollick et al. | Oct. 21, 1958 |
| 2,861,910 | Johnston et al. | Nov. 25, 1958 |
| 2,887,461 | Hort | May 19, 1959 |
| 2,897,732 | Shuger | Aug. 4, 1959 |

OTHER REFERENCES

Dean: "Modern Colloids," Van Nostrand, New York (1949), page 233.

Payne: "Organic Coating Technology," volume I, John Wiley & Sons, New York (1954), page 632.